United States Patent [19]
Fresnel et al.

[11] Patent Number: 4,585,618

[45] Date of Patent: Apr. 29, 1986

[54] CERMETS AND THEIR MANUFACTURE

[75] Inventors: Jean-Marie Fresnel, St. Genis; Pierre-Etienne Debély, Geneva; Jean-Pierre Waefler, Troinex, all of Switzerland

[73] Assignee: ELTECH Systems Corporation, Boca Raton, Fla.

[21] Appl. No.: 580,532

[22] Filed: Feb. 15, 1984

[30] Foreign Application Priority Data

Feb. 16, 1983 [EP] European Pat. Off. ........ 83810065.9

[51] Int. Cl.$^4$ .............................................. B22F 1/00
[52] U.S. Cl. ........................................ 419/12; 419/10; 419/19; 419/34; 419/45; 419/47; 204/242; 204/292
[58] Field of Search .................... 419/10, 12, 19, 47, 419/64, 34, 45, 47; 204/242, 292

[56] References Cited

U.S. PATENT DOCUMENTS

| | | | |
|---|---|---|---|
| 3,037,857 | 6/1962 | Conant | 419/12 X |
| 3,166,415 | 1/1965 | Conant | 419/12 |
| 3,230,079 | 1/1966 | Conant | 419/12 X |

FOREIGN PATENT DOCUMENTS

WO8300171 1/1983 PCT Int'l Appl. .

*Primary Examiner*—Stephen J. Lechert, Jr.
*Attorney, Agent, or Firm*—John J. Freer

[57] ABSTRACT

A cermet is produced by providing a bulk reaction mixture of particulate reactants which react to produce a self-sustaining ceramic body, and carrying out the reaction with the bulk reaction mixture in contact with molten metal which moderates the reaction and infiltrates the resulting ceramic body. The method is particularly applicable for boride-based ceramics infiltrated with aluminum, suitable as components of electroytic cells for the production of aluminum by molten salt electrolysis.

17 Claims, No Drawings

CERMETS AND THEIR MANUFACTURE

TECHNICAL FIELD

The invention relates to ceramic-metal composites (cermets), methods of producing same and application of the cermets as components of electrolytic cells for the production of metals by molten salt electrolysis.

BACKGROUND ART

Ceramic-metal composites, known as cermets, usually comprise a minor proportion of a metal phase intimately dispersed on a microstructural scale within a major proportion of a ceramic phase. The term ceramic is understood to include oxides, borides, nitrides carbides, silicides and mixtures and combinations thereof such as oxynitrides, typically of metals such as those from Group IIIb (scandium, yttrium, lanthanium, actinium), the lanthanides and actinides, group IVb (titanium, zirconium, hafnium), group Vb (vanadium, niobium, tantalum), group VIb (chromium, molybdenum, tungsten), aluminum and silicon.

Cermets have properties which differ from those of either phase alone. The ceramic provides hardness, abrasion resistance and improves the mechanical properties at high temperatures; the metal improves the strength, ductility, toughness and electrical conductivity. They are conventionally made by well known powder metallurgical methods, i.e. by preparing and mixing individual metal and ceramic powders, pressing into the required shape in a die and subjecting to a sintering heat treatment to bond the particles and develop the required structural integrity, often by direct ceramic-to-ceramic bonding.

Recently, International Patent Applicaton No. PCT/EP 82/00140, publication No. WO 83/00171, has proposed composite materials of aluminum and an aluminum oxycompound, typically alumina, and optionally with additives such as borides, nitrides and carbides, which show great promise for those components of aluminum production cells which in use are normally covered with molten aluminum, including current-carrying components such as a cathode or cathode current feeder, part of a bipolar electrode, an anode current collector for an electrorefining cell, other electrically conducting components such as a cell lining, and non-conductive cell components including separator walls, weirs and packing elements. These composite materials are formed by submitting particles of aluminum and the aluminum oxycompound and/or oxides which will form the aluminum oxycompound by reaction with the aluminum, and optionally with powders of the additives, to a heat treatment. Typically the particles are hot pressed or cold pressed and then heated. However, when a high aluminum content is desired to enhance the electrical conductivity it is difficult by these methods to obtain a structure which remains rigid at the operating temperature (about 1000° C.).

To provide an improved cell component, it was proposed in U.S. patent application Ser. No. 454719 (Sane et al), as yet unpublished, to provide a preformed matrix of alumina, aluminum nitride, aluminum oxynitride, SiAlON, boron nitride, silicon carbide, silicon nitride or aluminum boride which has voids throughout its structure, the voids then being filled with aluminum, e.g. by infiltrating a porous structure with molten aluminum. One of the preferred methods of preforming the matrix was the aluminothermic, carbothermic or combined carbo-aluminothermic reduction of a homogeneous $TiO_2.B_2O_3$ oxide glass powder, this method being further described in U.S. patent application Ser. No. 454718 (Sane).

Oxide-boride ceramics and their application as cell components in electrolytic aluminum production cells are also described and claimed in as yet unpublished U.S. patent applications Ser. No. 454671 and Ser. No. 454672, both in the name of de Angelis. In one example, powders of titanium dioxide, boron oxide and aluminum were hot pressed to form a reaction-sintered aluminatitanium diboride composite of uniform grain size (95 vol % of both oxide and boride phases less than or equal to 7 micron, the largest grain size being 10 micron), and 2.6% open porosity. Such reaction-sintered composites are wett-able and resistant to molten aluminum, and are therefore suitable for insert-ion into an aluminum prodction cell for use as a component which may contact the molten aluminum but preferably remains out of contact with molten cryolite.

DISCLOSURE OF INVENTION

According to the invention, a cermet is produced by providing a bulk reaction mixture of particulate reactants which react to produce a sintered self-sustaining ceramic body, and carrying out the reaction with the bulk reaction mixture in contact with molten metal which infiltrates the resulting ceramic body.

In order to facilitate penetration of the molten metal into the pores of the reaction-sintered ceramic body, the ceramic phase should be wettable by the molten metal. Typically, in the case of reaction/infiltration in contact with molten aluminum, the ceramic will preferably comprise a suitable amount of a refractory aluminum-wettable boride. The ceramic may be a boride-oxide composite for example titanium diboride-alumina formed by reaction from intimately mixed titanium oxide, boron oxide and aluminum to carry out the reaction $$3TiO_2 + 3B_2O_3 + 10Al \rightarrow 3TiB_2 + 5Al_2O_3$$

The best results to date have been obtained with these powdered reactants in the molar ratio 3:3:(10-50). However, when the reaction has been carried out under molten aluminum, a satisfactory result can still be obtained with at least half the required quantity of aluminum in the reactant powders. With lesser quantities of aluminum powder, for example one tenth the required quantity, insufficient boride was formed to promote thorough infiltration of the molten aluminum necessary to complete the reaction inside the bulk. The reaction/infiltration has also successfully been carried out with an excess of aluminum powder in the reaction mixture, namely up to five times the required amount. Including greater quantities of aluminum powder in the reaction mixture appears to be feasible, but not advantageous.

When aluminum is used as the molten metal which contacts the reaction mixture and infiltrates the reaction-sintered ceramic, the reaction preferably starts at a temperature in the range 660°-1100° C. For example, the above reaction starts at about 730° C. Other possible reactions are:

$$3TiO_2 + 4Al + 6B \rightarrow 3TiB_2 + 2Al_2O_3$$

$$Ti + 2Al + B_2O_3 \rightarrow TiB_2 + Al_2O_3$$

$$2AlB_2 + Ti_2O_3 \rightarrow 2TiB_2 + Al_2O_3$$

$$Ce_2O_3 + 6B_2O_3 + 14Al \rightarrow 2CeB_6 + 7Al_2O_3$$

$$Al_3Ti + B_2O_3 \rightarrow TiB_2 + Al_2O_3 + Al$$

and many other reactions are possible.

These reactions are very exothermic. By carrying out the reactions in contact with molten metal, there are high heat transfer coefficients and conductivities which help to extract reaction heat rapidly. The molten metal thus serves as a heat sink which prevents local overheating of the reactants and this provides a ceramic of different structure to that which is obtained by the same reaction under an inert atmosphere. Usually, the bodies which are hot pressed or otherwise sintered under an inert atmosphere have cracks and lack strength. The ceramic phase of the metal-infiltrated cermets produced according to the invention is considerably stronger and is crack free. This is particularly true for bodies produced according to the above reaction with excess aluminum powder in the reaction mixture. When these mixtures are hot pressed in the conventional way, the mechanical strength of the resulting bodies is very poor but when the same reaction is carried out under molten aluminum a mechanically strong cermet body is obtained.

Although the invention is described with particular reference to aluminum as the molten metal for contacting the reaction mixture and infiltrating the reaction-sintered ceramic, the same principle applies to other metals which may desirably form the metal phase of the ceramic and which have suitable melting points, for example magnesium, calcium, strontium, barium, copper, silver, gold, zinc, iridium, tellurium, tin, lead, antimony, bismuth, polonium, cerium and other lanthanides, uranium and other actinides and, possibly, iron. Alloys and intermetallic compounds may also be used.

The reaction-sintered ceramic body produced in the method of the invention is a self-sustaining porous structure with open porosity typically occupying 40–60 volume %. Usually, the molten metal infiltrates the pores throughout the body although infiltration is not necessarily complete in that the pores need not be filled fully. In applications where complete filling of the pores is required, this can be achieved by appropriate expedients e.g. by carrying out the reaction under vacuum or under pressure. In some instances, particularly for example when the above quoted reaction mixture has excess aluminum powder, the molten aluminium from outside the reaction mixture may only infiltrate the surface of the reaction sintered ceramic body which contains some excess unreacted aluminum from the reaction mixture.

The bulk reaction mixture may be a self-sustaining body of the particulate reactants, e.g. a cold pressed body. If desired, such a body can include a binder which can be volatilized prior to the reaction. However, in the case of powdered titanium oxide, boron oxide, aluminum mixture a binder way not necessarily be required. Alternatively, the bulk reaction mixture can comprise compacted particulate reactants which will form a self-sustaining ceramic body by sintering. The reaction mixture may e.g. be pre-sintered at temperatures below the limit at which the reaction sintering is initiated, to provide green bodies of more ductile consistency than the porous bodies obtained by simple pressing.

It has been found that typically a cold-pressed body of reactants will undergo a volumetric expansion of the order of 15–25% in each main direction if it is unrestrained during the reaction. Compacted particulate reactants likewise tend to undergo an expansion and this may assist densification and pressing the compact into self-sustaining shapes by physical contact of the compact against adjacent rigid walls and the like, which restrain expansion. Likewise, densification of a preformed body of reactants can be assisted by restraining the expansion.

If desired, the reaction mixture may include some preformed ceramic, e.g. a powder of alumina or titanium diboride, or a woven or felted fibrous mat, or a rigid structure such as an extruded honeycomb of alumina.

The described method may suitably be carried out in an electrolytic cell for the production of a metal by molten salt electrolysis, i.e. electrowinning or electrorefining cells, wherein the bulk reaction mixture is contacted with molten metal which is the same metal as that produced in the cell. This method may be carried out as part of a cell start-up procedure, wherein heat released by the reaction is absorbed by the molten metal and is used to heat up the cell to the operating temperature. For example, it has been found that the quoted reaction to form an aluminum-infiltrated reaction-sintered titanium diboride-alumina ceramic can be carried out without the temperature exceeding the normal cell operating temperature of about 960° C.

In this method for forming a cell component in-situ in the cell, the reaction mixture may comprise particulate reactants which are compacted on the cell bottom and-/or between self-sustaining bodies such as blocks or walls which protrude from the cell bottom. In this case, the reaction mixture forms a ramming paste and the tendency of the reacted mixture to expand assists densification of the resulting cermet. The reaction mixture may also comprise at least one self-sustaining body of the particulate reactants which is pressed into shape outside the cell and is introduced into the cell where the reaction takes place; possibly, the joints between such reaction bodies can be filled with particulate reaction mixture, or enough room may be left for expansion.

Alternatively, the reaction to produce the cell component of cermet material is carried out by contacting the reaction mixture with molten metal outside the cell. The cell component, possibly enveloped in the metal, is then introduced in the cell in any appropriate manner.

These cell components of cermets according to the invention are useful in metal winning and refining cells in applications where they may be normally covered by the molten aluminum, such as those mentioned in "Background Art", as well as the floor of a sump and as material used to limit electrolyte penetration into the cell insulation.

The invention also pertains to the production of metal, e.g. aluminum, in an electrolytic cell by molten salt electrolysis, in which the electrowon metal is in contact with a component of a cermet produced in-situ in the cell or outside the cell as described above and in which the metal phase of the cermet is the same as the electrowon metal.

The invention will be further illustrated in the following examples:

EXAMPLE I

A powder mixture was made of 99% purity titanium dioxide, 99.9% purity boron oxide, and 99.5% purity aluminum, all of grain size less than 44 micron, in the molar ratio 3:3:10. The powders were mixed and milled for 48 hours in a polyethylene bottle containing alumina balls and then cold pressed into a cylindrical body at a pressure of 1000 kg/cm$^2$. The cold pressed body was then heated in an alumina container under molten aluminum at 960° C. for 100 hours in an argon atmosphere. After cooling the body was inspected. It was found to consist of a cermet with titanium diboride-alumina as the ceramic phase and aluminum as the metal phase. A trace of Al$_3$Ti was found in the aluminum at the surface of the body. The cermet contained titanium diboride and alumina in the exact molar ratio 3:5 indicating complete reaction of the reactant powders and infiltration of the titanium diboride-alumina ceramic with molten aluminum from outside the body (all of the aluminum powder in the body having been reacted). The ceramic had a void volume of about 50%; these voids were substantially filled with aluminum at the surface and in the middle about 30 vol% of the voids were filled with aluminum. The aluminum was in wetting contact with the surface of the ceramic throughout the voids and also on the outer surface of the ceramic.

EXAMPLE II

The procedure of Example I was repeated, except that the heat treatment under molten aluminum at 960° C. was carried out for 18 hours. During the last two hours of this treatment an alumina rod was dipped into the molten aluminum and applied against the body with a pressure of 12 kg/cm$^2$. After cooling, it was found that the cermet body had not been deformed by the applied pressure, indicating that the body was self-sustaining and resistant to deformation at 960° C.

EXAMPLE III

The procedure of Example I was repeated, except that the reaction powder mixture was placed in the alumina container and compacted using a hand punch. After the same 100 hour exposure to molten aluminum at 1000°0 C., it was found that the powder had reacted to form a self-sustaining titanium diboride-alumina ceramic infiltrated with aluminum. Some particles of the titanium diboride-alumina ceramic were also found in the solidified aluminum.

EXAMPLE IV

The procedure of Example III was repeated, but the heat treatment under molten aluminum at 960° C. was carried out for 15 hours. During the last two hours of this treatment a alumina rod was dipped into the molten aluminum and applied against the powder compact with a pressure of 13 kg/cm$^2$. After cooling, it was found that a cermet body had been formed with a shape corresponding to the original compact. This indicates that a self-sustaining cermet body had already been formed after 13 hours of treatment, this body being resistant to deformation at 960° C.

EXAMPLE V

A cermet formed as in Example I was tested under cathodic polarization for ten hours. The sample was immersed in a pool of molten aluminum at 1000° C. under cryolite saturated with alumina and was polarized cathodically at a current density of 0.5 A/cm$^2$. After the test, the sample showed macroscopic stability.

EXAMPLE VI

Two bodies were cold pressed from powders of titanium dioxide, boron oxide and aluminum as in Example I in the ratio 3:3:20 at a pressure of 630 kg/cm$^2$. One body was then heated under molten aluminum at 960° C. for 12 hours in an argon atmosphere; by way of comparison, the other body was heated for the same duration at the same temperature in an argon atmosphere only. The body heated under aluminum retained its shape, had a metallic appearance in cross-section and was electrically conducting. It consisted of a reaction sintered titanium diboride-alumina ceramic which contained residual unreacted aluminum from the reaction mixture and into which further aluminum had penetrated. The aluminum perfectly wetted tehe ceramic structure. The body heated under argon only consisted of titanium diboride-alumina with residual unreacted aluminum; however, it was highly porous, mechanically weak, had a deformed shape with a bulbous surface and was electrically non conducting.

EXAMPLE VII

The procedure of Example I was repeated except that an extruded alumina honeycomb with square-section openings measuring approx. 2×2 mm was included in the powder mixture prior to cold pressing. The duration of heating under molten aluminum at 960° C. was 17 hours. After cooling, inspection of the body showed that the honeycomb was encapsulated in the aluminum-infiltrated titanium diboride-alumina cermet. The walls of the honeycomb were well wetted by the aluminum. The cermet which was restrained inside the openings of the honeycomb was denser than the cermet surrounding the honeycomb.

EXAMPLE VIII

Twelve bodies of the same composition as in Example VI were prepared at a pressure of 630 kg/cm$^2$. During 45 min. they were heated up to 170° C. and held at this temperature for two hours to dry them completely. Subsequently they were further heated up to 440° C. during one hour and held at this temperature for 3 hours. Six bodies received this heat treatment under vacuum until they reached the temperature of 440° C. and maintained under argon during the subsequent 3 hours, the other six samples were kept under normal air atmosphere during the entire treatment. No significant differences could be observed between the two groups of samples. After the described treatment the samples already had a metal-like ductability, and were easy to saw and to machine. The above heat treatment allows one to manufacture green bodies before the reaction sintering process, which are easy to shape for their further application.

We claim:

1. A method of producing a ceramic-metal composite (cermet), comprising providing a bulk reaction mixture of particulate reactants capable of reacting to produce a sintered self-sustaining ceramic body, bringing said reaction mixture to a reaction temperature in contact with a mass of molten metal, and carrying out a reaction with the bulk reaction mixture in contact with the molten metal whereby said ceramic body produced by said reaction is infiltrated with the molten metal.

2. The method of claim 1, wherein the ceramic is a boride-oxide composite.

3. The method of claim 2, wherein the reaction mixture is prepared from intimately mixed titanium oxide, boron oxide and aluminum.

4. The method of claim 3, wherein the reactants are substantially in the molar ratio $3TiO_2:3B_2O_3:(10-50)Al$.

5. The method of any preceding claim, wherein the reaction mixture is contacted with molten aluminum.

6. The method of claim 5, wherein the reaction is started at a temperature in the range 660° C.–1100° C.

7. The method of any one of claims 1 to 4, wherein the bulk reaction mixture comprises a self-sustaining body of the particulate reactants.

8. The method of any one of claims 1 to 4, wherein the bulk reaction mixture comprises compacted particulate reactants.

9. The method of any one of claims 1 to 3 which is carried out in an electrolytic cell for the production of a metal by molten salt electrolysis, wherein the bulk reaction mixture is contacted with molten metal which is the same metal as that produced in the cell.

10. The method of claim 9 which is carried out as part of a cell start-up procedure, wherein heat released by the reaction is used to heat up the cell.

11. A method of producing a component of an electrolytic cell for the production of metal by molten salt electrolysis which component comprises a ceramic-metal composite, comprising providing a bulk reaction mixture of particulate reactants capable of reacting to produce a sintered, self-sustaining ceramic body, bringing said reaction mixture to a reaction temperature in contact with a mass of molten metal, and carrying out a reaction with the bulk reaction mixture in contact with the molten metal whereby said ceramic body produced by said reaction is infiltrated with the molten metal which is the same metal as that to be produced in the cell.

12. The method of claim 11, wherein the bulk reaction mixture comprises particulate reactants which are compacted on the cell bottom and/or between self-sustaining bodies protruding from the cell bottom.

13. The method of claim 11 or 12, wherein the bulk reaction mixture comprises at least one self-sustaining body of the particulate reactants which is pressed into shape outside the cell and introduced into the cell where the reaction takes place.

14. The method of claim 11, wherein the reaction to produce the cermet cell component is carried out outside the cell.

15. A component of an electrolytic cell for the production of metal by molten salt electrolysis which comprises a cermet produced by the method of any one of claims 1 to 4, 11 and 12.

16. An electrolytic cell for the production of metal by molten salt electrolysis, comprising a cell component of a cermet produced by the method of any one of claims 1 to 3, in which the metal phase of the cermet is the same as the electrowon metal.

17. The production of metal in an electrolytic cell by molten salt electrolysis, in which the electrowon molten metal is in contact with a component of a cermet produced by any one of claims 1 to 3 and in which the metal phase of the cermet is the same as the electrowon metal.

* * * * *